US010600296B2

(12) United States Patent
Hurley et al.

(10) Patent No.: US 10,600,296 B2
(45) Date of Patent: Mar. 24, 2020

(54) PHYSICAL KNOWLEDGE ACTION TRIGGERS

(71) Applicant: Google LLC, Mountain View, CA (US)

(72) Inventors: Fergus Gerard Hurley, San Francisco, CA (US); Robin Dua, San Francisco, CA (US)

(73) Assignee: Google LLC, Mountain View, CA (US)

( * ) Notice: Subject to any disclaimer, the term of this patent is extended or adjusted under 35 U.S.C. 154(b) by 546 days.

(21) Appl. No.: 14/830,080

(22) Filed: Aug. 19, 2015

(65) Prior Publication Data

US 2017/0054812 A1 Feb. 23, 2017

(51) Int. Cl.
*G08B 13/196* (2006.01)
*G06F 3/0482* (2013.01)
(Continued)

(52) U.S. Cl.
CPC ..... *G08B 13/19615* (2013.01); *G06F 3/0482* (2013.01); *G06F 16/434* (2019.01);
(Continued)

(58) Field of Classification Search
CPC ........ G06B 13/19615; G06B 13/19669; G06B 13/1968; G08B 13/19615; G08B 13/1968; G08B 13/19669; G06F 3/0482; G06F 3/04842; G06F 16/487; G06F 16/434; G06F 16/9537; G06F 17/30041; G06F 17/30867; G06F 17/30047; G06F 17/30286;
(Continued)

(56) References Cited

U.S. PATENT DOCUMENTS

| 7,334,000 B2 | 2/2008 | Chhatrapati et al. |
| 8,498,814 B2 * | 7/2013 | Irish ........................ A63F 13/12 701/409 |

(Continued)

FOREIGN PATENT DOCUMENTS

| JP | 2014-38374 | 2/2014 |
| JP | 2014-529778 | 11/2014 |

(Continued)

OTHER PUBLICATIONS

Paula DuPont, "How to Automate Anything with IFTTT", tutsplus.com, Computer Skills Tutorials, https://computers.tutsplus.com/tutorials/how-to-automate-anything-with-ifttt--cms-20537, Apr. 14, 2014, pp. 1-12 (Year: 2014).*

(Continued)

*Primary Examiner* — Andrew L Tank
(74) *Attorney, Agent, or Firm* — Fish & Richardson P.C.

(57) ABSTRACT

Methods, systems, and apparatus, for defining and monitoring an event for a physical entity and the performance of an action in response to the occurrence of the event. A method includes receiving data indicating an event for a physical entity, the event specified in part by a physical environment feature for which the occurrence of the event is to be monitored by the data processing apparatus; receiving data indicating an action associated with the event and to be taken in response to the occurrence of the event; monitoring for the occurrence of the event for the physical entity; and in response to the occurrence of the event, causing the action associated with the event to be performed.

15 Claims, 10 Drawing Sheets

(51) Int. Cl.

| | | |
|---|---|---|
| *H04W 4/029* | (2018.01) | |
| *G06Q 30/02* | (2012.01) | |
| *H04W 4/02* | (2018.01) | |
| *G06F 16/487* | (2019.01) | |
| *G06T 19/00* | (2011.01) | |
| *G06F 16/432* | (2019.01) | |
| *G06F 16/9537* | (2019.01) | |
| *H04L 29/06* | (2006.01) | |
| *H04L 29/08* | (2006.01) | |
| *G06F 3/0484* | (2013.01) | |
| *G06Q 10/10* | (2012.01) | |

(52) U.S. Cl.
CPC ........ *G06F 16/487* (2019.01); *G06F 16/9537* (2019.01); *G06Q 30/0261* (2013.01); *G06T 19/006* (2013.01); *G08B 13/1968* (2013.01); *G08B 13/19669* (2013.01); *H04L 67/18* (2013.01); *H04L 67/38* (2013.01); *H04W 4/02* (2013.01); *H04W 4/029* (2018.02); *G06F 3/04842* (2013.01); *G06Q 10/109* (2013.01); *G06Q 30/0259* (2013.01); *G06Q 30/0267* (2013.01)

(58) Field of Classification Search
CPC ........... G06Q 30/0261; G06Q 30/0267; G06Q 30/0259; G06Q 10/109; G06T 19/006; H04W 4/029; H04W 4/02; H04L 67/38; H04L 67/18
See application file for complete search history.

(56) References Cited

U.S. PATENT DOCUMENTS

| | | | |
|---|---|---|---|
| 8,766,793 B2 | 7/2014 | Elumalai et al. | |
| 8,831,255 B2* | 9/2014 | Crawford | H04S 7/304 |
| | | | 381/17 |
| 2004/0019603 A1 | 1/2004 | Haigh et al. | |
| 2004/0030753 A1 | 2/2004 | Horvitz | |
| 2005/0251558 A1 | 11/2005 | Zaki | |
| 2006/0227997 A1* | 10/2006 | Au | G06K 9/00771 |
| | | | 382/103 |
| 2008/0004926 A1 | 1/2008 | Horvitz et al. | |
| 2008/0021876 A1* | 1/2008 | Ahern | G06F 9/45512 |
| 2009/0002492 A1* | 1/2009 | Velipasalar | G08B 13/19615 |
| | | | 348/152 |
| 2009/0102859 A1* | 4/2009 | Athsani | G06F 3/011 |
| | | | 345/619 |
| 2009/0157672 A1 | 6/2009 | Vemuri | |
| 2010/0214428 A1* | 8/2010 | Wood | H04N 1/0035 |
| | | | 348/222.1 |
| 2010/0271202 A1 | 10/2010 | Lin | |
| 2011/0113382 A1* | 5/2011 | Cannon | G06N 3/006 |
| | | | 715/848 |
| 2012/0232966 A1* | 9/2012 | Calman | G06Q 30/02 |
| | | | 705/14.1 |
| 2012/0293341 A1 | 11/2012 | Lin | |
| 2013/0027651 A1 | 1/2013 | Meldrim | |
| 2013/0117263 A1 | 5/2013 | Lukose et al. | |
| 2014/0082501 A1 | 3/2014 | Bae et al. | |
| 2014/0100904 A1 | 4/2014 | Wolf et al. | |
| 2014/0113560 A1 | 4/2014 | Graube et al. | |
| 2014/0247383 A1 | 9/2014 | Dave et al. | |
| 2014/0351800 A1* | 11/2014 | Jao | G06F 8/41 |
| | | | 717/140 |
| 2014/0354686 A1* | 12/2014 | Mullins | G06T 19/006 |
| | | | 345/633 |
| 2014/0365345 A1 | 12/2014 | Isogai et al. | |
| 2015/0087258 A1* | 3/2015 | Barnes | H04W 4/90 |
| | | | 455/404.2 |
| 2015/0185713 A1* | 7/2015 | Glickfield | H04L 67/12 |
| | | | 700/44 |
| 2015/0187201 A1 | 7/2015 | Yuksel et al. | |
| 2015/0227797 A1 | 8/2015 | Ko et al. | |
| 2016/0041981 A1* | 2/2016 | Ben Zvi | G06F 17/30041 |
| | | | 707/770 |

FOREIGN PATENT DOCUMENTS

| | | |
|---|---|---|
| RU | 2295758 C2 | 3/2007 |
| WO | WO 2014/047501 | 3/2014 |
| WO | WO 2014/050113 | 8/2016 |

OTHER PUBLICATIONS

International Search Report and Written Opinion in Application No. PCT/US2016/047773, dated Nov. 29, 2016, 12 pages.

JP Office Action issued in Japanese Application No. 2017-556916, dated Nov. 5, 2018, 5 pages (with English translation).

RU Office Action issued in Russian Application No. 2017137751/08 (065913), dated Nov. 27, 2018, 8 pages.

KR Office Action issued in Korean Application No. 10-2017-7031467, dated Aug. 2, 2018, 14 pages (with English Translation).

GB Office Action issues in Great Britain Application No. GB1717836.9, dated Apr. 1, 2019, 5 pages.

EP Office Action in European Application No. 16837908.9, dated Aug. 12, 2019, 11 pages.

\* cited by examiner

PHYSICAL KNOWLEDGE ACTION TRIGGERS

BACKGROUND

The advent of cloud based services, search engines, mobile applications, and location-aware devices have drastically expanded the utility of mobile user devices over the last decade. Many such user devices now provide context-aware services and applications in addition to voice and data access. Furthermore, with the recent advances in processing systems, many previously disparate applications and services are now able to work together to provide enhanced capabilities and user experiences.

Many application services available to users are instantiated by use of command inputs. One such service is creating action triggers. For example, a user may speak (or type) the input "remind me to buy milk this evening" into a smartphone, and the smartphone, using a command parsing application (or, alternatively, communicating with a command parsing service) will invoke an action trigger process that may create a reminder, create messages and/or calendar entries, and solicit additional information from the user. Such information may be a time, if the user desires for the action trigger to be performed at a certain time, and/or a location, if the user desires for the action trigger to be performed when the user arrives at the location. While the setting of such action triggers is a very useful and relatively fluid user experience, available triggers historically have been limited to a set of options provided by an application or service.

SUMMARY

This specification relates to defining and monitoring an event for a physical entity and the performance of an action in response to the occurrence of the event.

In one aspect, a method includes receiving data indicating an event for a physical entity, the event specified in part by a physical environment feature for which the occurrence of the event is to be monitored by the data processing apparatus; receiving data indicating an action associated with the event and to be taken in response to the occurrence of the event; monitoring for the occurrence of the event for the physical entity; and in response to the occurrence of the event, causing the action associated with the event to be performed. Other embodiments of this aspect include corresponding systems, apparatus, and computer programs, configured to perform the actions of the methods, encoded on computer storage devices.

In another aspect, a method includes receiving data specifying a physical environment feature for which an event for a physical entity is to be monitored; responsive to the data specifying the environment feature, providing data that causes a user device to display an action trigger menu that displays a respective event selection input for each of one or more events associated with the physical environment feature; receiving data specifying a selection at the user device of one of the event selection inputs to specify an event; associating, with the event, an action to be taken in response to the occurrence of the event; and providing data indicating the event for the physical entity and data indicating the action associated with the event. Other embodiments of this aspect include corresponding systems, apparatus, and computer programs, configured to perform the actions of the methods, encoded on computer storage devices.

The events and actions may be independent of the physical entity in that they need not be selected from a list that is dependent on the physical entity, but rather may be defined by the user according to one or more inputs. Likewise, the event and actions may also be independent from each other in that a particular event need not be categorically, semantically, or otherwise related to the action that is to be performed. Indeed, the association of an event and action may be completely arbitrary from a data relationship perspective. For example, a user may desire to wash his car, but when preparing to do so he realizes he is out of concentrated automobile soap, and thus orders a bottle of the concentrated soap from an on-line retailer. The user may then, by use of the system described in this specification, define an event as a package being present on the user's doorstep, and the action that may be associated with the event may be a reminder to wash a car. Thus, assuming the user is not expecting to receive any package other than the detergent, the detection of the package on the user's doorstep will result in the action of presenting a reminder to wash the car.

The system thus facilitates the association of multiple physical entities with multiple different possible events and multiple different actions. This allows a user unprecedented flexibility to arrange tasks, schedules, and actions according to the entirely unique and heretofore undiscovered entity and task relations that are emergent from the user's unique needs.

A user may create action triggers based on a much wider range of occurrences or events than heretofore possible. A trigger may invoke a reminder to a user, such that action to be taken based on such trigger is taken manually as prompted by the reminder. Alternatively, a trigger may simply provide information for the user's interest, with no further action necessarily implied. As another alternative, a user may set a trigger to automatically take some action. As still another alternative, a user may set a trigger to present, upon the occurrence of an event, a single approval action to approve a subsequent action, and upon such approval the subsequent action is performed. In still yet another alternative, automated actions can be taken by third party applications or systems that may be communicating with the system described herein.

Action triggers based on events and actions to be performed upon the occurrence of the events may be set from a dedicated reminder application, or from another application such as a browser or calendar, or from some other type of system configured to receive user input for the purpose of establishing an action trigger and associated action. These latter systems may include search engines, electronic assistants, including voice-based assistants, and the like. Furthermore, a triggering and notification system may be configured to communicate with an otherwise independent user interface front-end, such that user instructions and notifications can be managed by the user interface front end.

A trigger may be based on a single occurrence or event. Alternatively, multiple occurrences or events may be grouped together to define a trigger. For example, a user may create a trigger to be reminded to wash the car only if the user is home when the package is detected at the user's doorstep.

The monitoring for an event for a physical entity may be accomplished in a variety of ways and is dependent on the monitoring to be performed. For example, for presence monitoring, which is the monitoring for the presences of a physical entity, data may be obtained from cameras that are used to monitor a particular location, or voice recognition from a source at a particular location, and so on. In the case of entity recognition, such as the case of monitoring for a box to be delivered on a doorstep, machine learned models can be accessed for object recognition. Thus, images may be processed to distinguish between objects, such as one or more persons, one or more animals, one or more boxes, etc.

Presence monitoring may also be accomplished by the particular physical entity making its location known. For example, a user may have a trigger based on the event of a food truck being within a certain distance of a particular location, e.g., within a block of the user's work address. The food truck may provide its location, via a wireless communication protocol, to a monitoring service, and the monitoring service determines when the event specified by the user is met. In variations of this implementation, the user may have a trigger based on the event of a food truck being within a certain distance of the user's location, and both the user's location and food truck location are monitored by the monitoring service.

For condition monitoring, which is the monitoring of the condition of a physical entity, the physical entity may provide data describing its condition to the monitoring service. For example, a user's home may have an intelligent watering system that monitors the moisture of the soil. The user may define a trigger to be notified when the soil moisture level falls below a certain level, or be notified when the sprinklers turn on automatically (and, optionally, when they subsequently turn off). Similarly, the user may have another action that triggers when the chance of rain is 80% (according to data received from a weather service) and the sprinklers have been disabled, and so on. By way of another example, the trigger is defined such that when the soil moisture level falls to a certain percentage, the sprinkler turns on automatically, and a notification is sent to user.

The system may, in some imp implementations, modify events automatically based on data that is relevant to the event. For example, the event for activation of the sprinkler may also take into account weather data. Thus, even if the moisture level is less than the certain percentage, the system may not determine the event has occurred (or not cause the action to be performed) if the weather data indicates rain within the next twenty-four hours.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
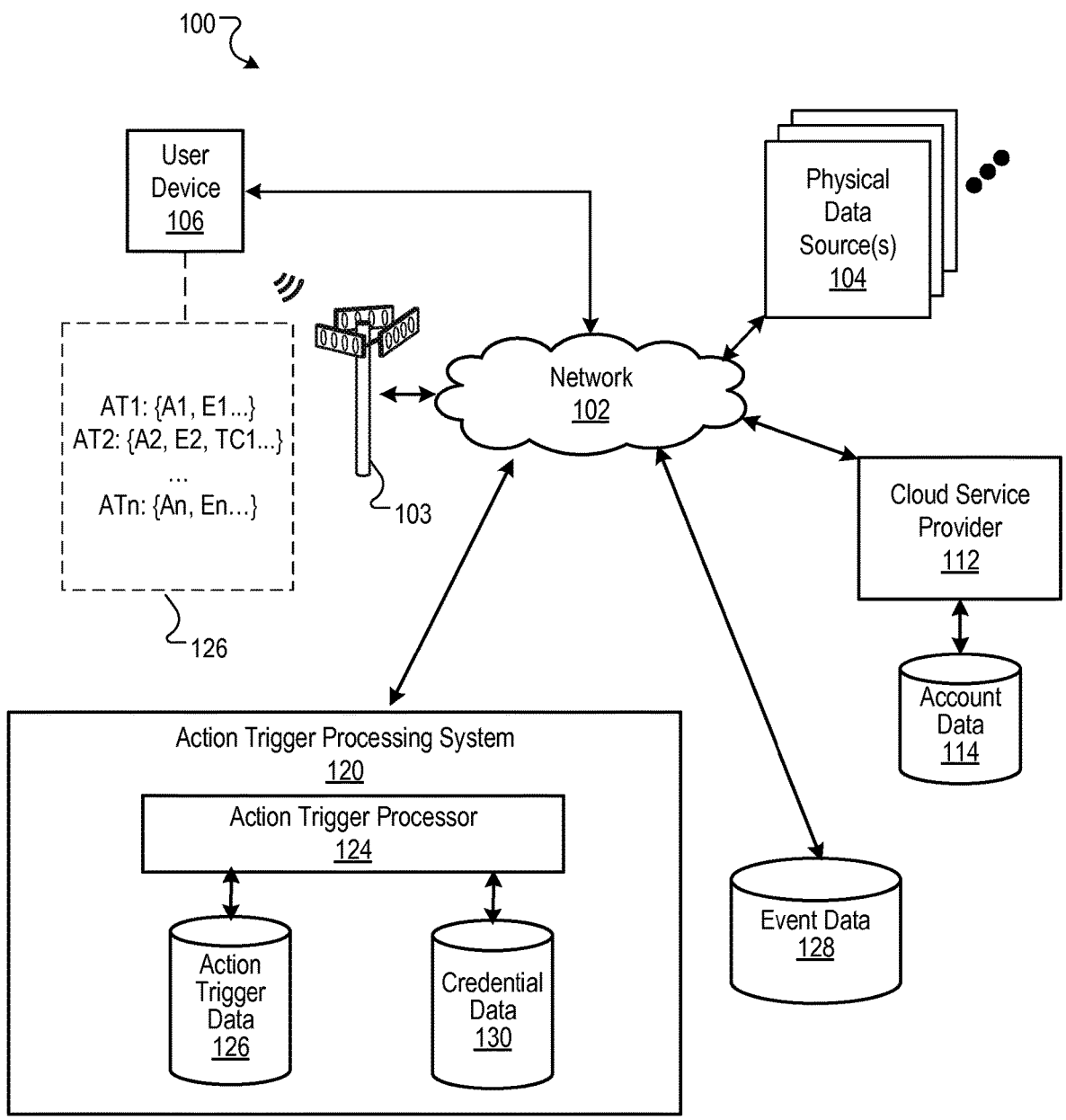
FIG. 1 is a block diagram of an example environment in which action triggers are monitored for the performance of associated actions.

FIG. 1 is a block diagram of an example environment 100 in which action trigger events are monitored for the performance of associated actions. A computer network 102, such as the Internet, or a combination thereof, provides for data communication between electronic devices and systems. The computer network 102 may also include, or be in data communication with, one or more wireless networks 103 by means of one or more gateways.

A physical data source 104 is a device, system or service that provides data about a physical entity. For example, the physical data source 104 may be a physical item that reports about its own condition by means of a data signal that specifies conditions of the physical entity. For example, a sprinkler head that provides its operational status and sensor readings such as soil moisture levels, a door lock that provides data describing whether it is locked or unlocked, an automobile that provides its location, etc. Alternatively, the physical data source 104 may be a system that provides data about itself, its location, and so on. Examples of systems includes a security system that monitors a home, a lighting control system in a building, a parking lot occupancy detection and monitoring system, and so on. These are just a few examples of physical data sources, and any other physical data source 104 that provides data about a physical entity can be used.

As used in this specification, a physical entity is a tangible entity for which physical environment features can be monitored by the physical data source 104. A physical entity can be the physical data source 104 itself, or can be something that the physical data source 104 is monitoring. In the case of the latter, the physical entity may be specified by the user, e.g., the user may specify the physical entity is a package if the user desires to monitor for the presence of a package at a location; the user may specify the physical entity is an automobile if the user desires to monitor for the presence or absence of an automobile in a particular parking location, and so on. Likewise, a physical environment feature may be a feature that is related to the entity that the user wants to use to trigger the action.

User device 106 is an electronic device that is under the control of a user and is capable of requesting and receiving resources over the network 102, also capable of performing other actions. Example user devices 106 include personal computers, mobile communication devices, wearable devices, and other devices that can send and receive data over the network 102. In the example of FIG. 1, the user device 106 is a smartphone. An example smartphone is described with reference to FIG. 5 below. The user device 106 may communicate over the networks 102 and 103 by means of wired and wireless connections with the networks 102 and 103, respectively. The user device 106 may also be a device that accesses the network 102 by means of an intermediate device and a short range wireless transceiver, such as a WiFi, Bluetooth, etc. As described with reference to FIG. 5, a user device may be able to perform a set of device actions for various programs and capabilities The user device 106 may be associated with a user account, such as an account hosted by a cloud service provider 112 that provides multiple services. These services may include search (web, intranet, documents, and applications, among others), web mail, calendar, social networking, messaging, documents storage and editing, an electronic assistant service, etc. The account data 114 may store data specific to the account of the user device 106. Further, although only one user device 106 is shown in FIG. 1, multiple user devices 106 may be included in the environment.

In some implementations, the user of a user device 106 may specify event triggers and associate them with actions. The occurrence of the event trigger (or simply "event"), cause that associated action to be performed. The specifying of events and actions can be facilitated by a variety of user interfaces, voice command processing systems, and interaction models. Typically a user will specify an association of an event with an action, as will be described in more detail below.

An action trigger processing system 120 receives an association of an event and an action and stores the action trigger in an action trigger data store 126. As used in this specification, an association of an event and an action is referred to as an "action trigger." While the action trigger processing system 120 is shown as a separate entity in FIG. 1, the action trigger processing system 120 can be implemented in the cloud service provider 112, or alternatively as a separate system by each third party. In certain embodiments, action trigger processing system 120, or subparts thereof, may form a portion of or be stored on user device 106.

The action trigger processor 124 accesses event data 128 to determine which events are met, and whether to perform the actions associated with the events that are determined to be met. As used herein, event data 128 is any data that can be used to determine whether an event has occurred, and in this particular application includes data reported by the physical data sources 104. For example, the event data 128, including the data reported by the physical data source 104, may be data that is provided to the action trigger processing system 120 by the third parties, or may be data that is requested by the action trigger processing system 120 periodically.

The action trigger processor 124 will store the action trigger in an action trigger data store 126. There may be a plurality of action triggers AT1, AT2, . . . ATn stored in action trigger data 126. A group of action triggers (e.g., those created or previously implemented by the user) may be viewed at the user device 106, and the user may make changes (e.g., add, delete, modify) at the user device 106 to the action triggers at any time. Each of the plurality of action triggers may have one or more events E1, E2, . . . En associated with an action. Upon the occurrence of an event, the action trigger processor 124 may cause the action to be performed. The action may be one or more of: the presentation of a notification that the event occurred; an action that is performed partly or fully automatically and separate from the user device (e.g., e.g., through a third party application or system by issuing a command to it); or the presentation of a prompt to perform another action.

The action may also be an action that is performed by another physical entity or that relates to another physical entity, such as a robotic entity. For example, given an event for specific weather conditions, e.g., a lack of rain forecast for the afternoon, an action may be the causing of a robotic mowing device to mow a lawn.

In some implementations, the action trigger proceeding system 120 includes credential data 130 that specifies credentials for users and that is used to authorize the performance of certain actions. For example, an action to purchase or establish some other financial or legal obligation on behalf of a user may require the user to provide credentials. The credentials may be required when the event has triggered, or, alternatively, may be required when establishing the association of the event and the action. Example credentials may include a user identifier, a password, and the like. Furthermore, in some implementations, a user may be authorized when credentials have been provided previously, e.g., such as when a user has established an authenticated connection with a secure network.

The user may also specify that notifications should be provided only during appropriate times during which the user is able to review and respond to the notifications. For example, the user may also set a condition that the user is not to be notified if the user is unavailable, based on the user's availability according to the user's calendar. Thus, the presentation of the notification may be delayed when the user's calendar indicates the user is currently engaged in an appointment, e.g., if the user is in a meeting as scheduled on the user's work calendar. Other conditions for an action to be performed may also be used in addition to a specified event occurrence.

Figure 2A:
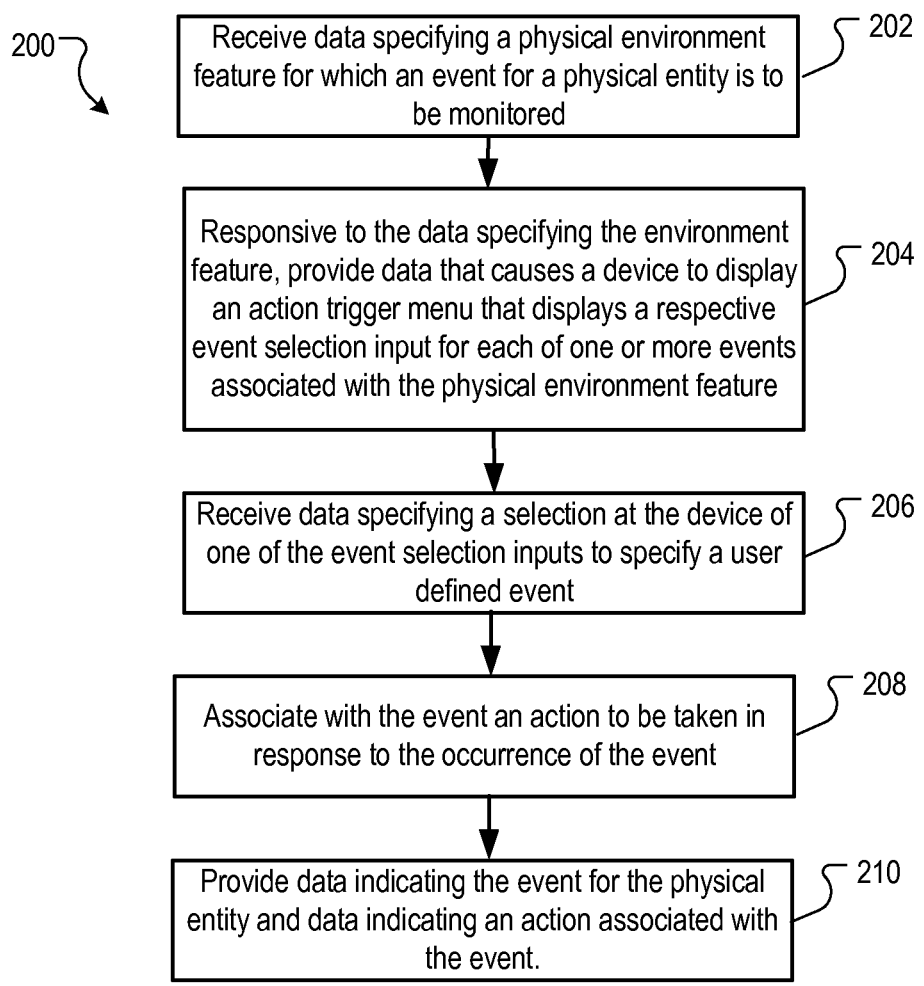
FIG. 2A is a flow diagram of an example process for creating an event for a physical entity and associating an action to be performed with the event.

As described above, the action trigger processing system 120 allows for the creation and monitoring of events for physical entities. The process of creating an action trigger is described with reference to FIG. 2A, which is a flow diagram of an example process 200 for creating an event for a physical entity and associating an action to be performed with the event. The process 200 can be performed by an electronic device, such as a user device, or, alternatively, can be performed by a server system in response to receiving selection data from a user device.

The process 200 receives data specifying a physical environment feature for which an event for a physical entity is to be monitored (202). The physical entity may be identified in a variety of ways. The data may be received from a user device, or some other device with which a user has interacted. For example, a user may specify the physical entity, such as by inputting a description of the physical entity, selecting the physical entity from a list of physical entities, or by some other manner. Alternatively, the physical entity may identify itself. For example, a food truck may communicate with a user device and identify itself and provide the user with the opportunity to create an action trigger.

The physical environment feature describes either the physical entity itself or an environment of the physical entity. An example of the latter is a location or series of locations in which the physical entity may be located. For example, for a physical entity of a particular automobile (or any automobile), the physical environment feature may be a particular parking space. Likewise, for a physical entity of a shipping container, the physical environment feature may a doorstep. Similarly, for the physical entity of a sprinkler system, the physical environment feature may be the state of the system. In yet another example, a food truck utilizing a wirelessly enabled system that communicates with the action trigger processing system may provide a list of various environment features related to the location of the food truck. The physical environment feature that is described may be selected by the user.

The process 200, responsive to the data specifying the environment feature, provides data that causes a device to display an action trigger menu that displays an input for each of one or more events (204). For example, once a user specifies a physical entity and a corresponding environment feature, the user may be presented with options that define an event for the physical entity and the physical environment feature. Continuing with the example above, for the physical entity of a particular automobile (or any automobile), the event may be the presence of the automobile in a particular parking space (or, alternatively, the absence of the automobile). Likewise, for a physical entity of the shipping container, the event may be the presence of the shipping container on the doorstep. Similarly, for the physical entity of a sprinkler system, the event may be a particular state of the system, e.g., the activation of the sprinkler system. Finally, for the physical entity of a food truck, the events may be location of a food truck relative to a current location, an address, or a user's future location.

In some implementations, a list of events are determined and presented to a user based on an association of physical environmental features to events corresponding to the physical entity and the environmental feature. For example, when a physical entity and an environment feature of a location are selected, the events may be the presence or absence of the entity at the location. Likewise, when a physical entity and an environment feature of states (e.g., on, off, etc.) of the physical entity are selected, the events may be the particular states of the physical entity.

The process 200 receives data specifying a selection at the device of one of the event selection inputs to specify an event (206). The user may select one of the events, and by doing so the action trigger processor 124 will be configured to monitor for the occurrence of the event. Additional events and conditions may also be selected. For example, a time window may be selected such that the event may be determined to occur only if the event occurs during the time window; if the event occurs outside of the time window, the action trigger processor will determine that the event has not occurred. To continue with one of the examples above, the event of a car being presented in a particular parking space may be further conditioned on the car being present in the parking space any time between the hours of 8:00 AM and 5:00 PM. Thus, if the car arrives at the parking space at 7:30 AM, and remains there for one hour, the event will be determined to occur at 8:00 AM.

The process 200 associates with the event an action to be taken in response to the occurrence of the event (208). The action is the action the user would like to be performed when the occurrence of an event is determined. The action may be, for example, the presentation of a reminder to do something, or the presentation of a confirmation command to have something done on behalf of the user, or an action that is fully or partially automatically performed without a reminder or confirmation to perform the action.

In some implementations, the action may be selected from a list of available actions. For example, in the case of a food truck, a variety of actions may be available, such as an automatic placement of an order and purchase of the same, or a notification of the location of the food truck, or a combination of both. In other implementations, the user may define the action independent of the event. For example, in the case of the food truck, the user may want to be presented with a notification that reads "Ask *Julia* if she wants to grab lunch with you."

The process 200 provides data indicating the event for the physical entity and data indicating an action associated with the event (210). Once the user defines the event and the action to be taken, the system, e.g., the user device 106 or the action trigger processing system 120, stores the data as an action trigger, which is an association of the event and the action and stores the action trigger in an action trigger data store. The data store is then accessed by the system for monitoring.

Figure 2B:
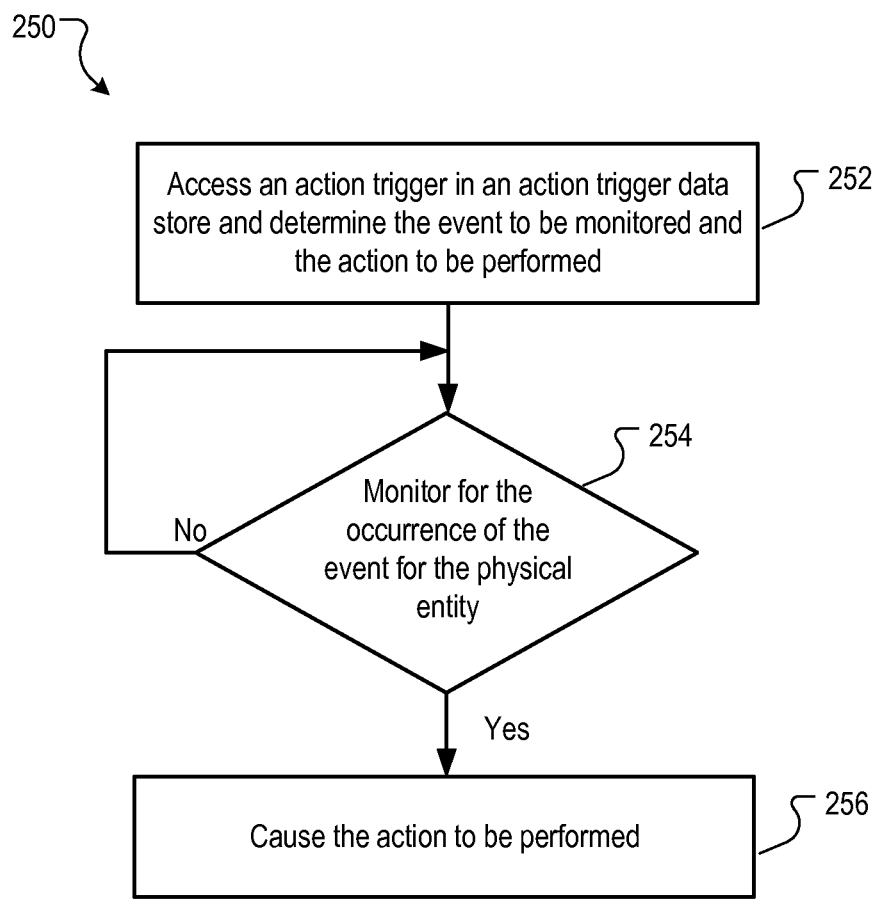
FIG. 2B is a flow diagram of an example process for monitoring an association of an event for a physical entity and performing an action based on the occurrence of the event.

FIG. 2B is a flow diagram of an example process 250 for monitoring an association of an event for a physical entity and performing an action based on the occurrence of the event. The process 250 can be performed by a user device, or, alternatively, can be performed by a server system in response to receiving selection data from a user device.

The process 250 accesses an action trigger in an action trigger data store and determines the event to be monitored and the action to be performed (252). Each action trigger includes data defining the event to be monitored and the action to be performed based on the monitoring of the occurrence of the event.

The process 250 monitors for the occurrence of the event for the physical entity (254). The event may be monitored by the action trigger processor 124 periodically, e.g., every N minutes, or may be determined to occur when the action trigger processor 124 receives a notification from a third party that the event has occurred. In the case of the latter, the third party may utilize one or more APIs to communicate or otherwise register the event with the action trigger processor. For example, in the case of the food truck described above, the food truck company may utilize a service offered by the action trigger processing system 120 and provide data to the action trigger processing system 120.

The process 250, in response to the occurrence of the event, causes the action associated with the event to be performed (256). As described above, the action may be the presentation of a reminder to do something. The action can also be the presentation of a confirmation command to have another action performed on behalf of the user. Alternatively, the action may be one that is automatically performed without a reminder or confirmation to perform the action. The action may be performed by the user device, or, alternatively, by a separate system.

In the case of a notification, the user may also specify that notifications should be provided only during appropriate times during which the user is able to review and respond to the notifications. For example, the user may also set a condition that the user is not to be notified if, based on the user's calendar, the user is in a meeting. Thus, the presentation of the notification may be delayed when the user's calendar indicates the user is currently engaged in an appointment, e.g., if the user is in a meeting as scheduled on the user's work calendar. A variety of notification types may be used, including a mobile operating system (OS) push notification, text message, email, a web or digital assistant alert, or other form of notification. In the case of a digital assistant alert, the digital assistant may determine the proper time, place, and method to notify the user or take action on the user's behalf. For example, if the user is in a business meeting, the digital assistant may wait to notify the user until the user is out of the meeting, or after the user's work day is completed.

Moreover, in some implementations, the presentation of the user defined action or performance of the user defined action may be provided to a device other than user device 106. For example, the presentation may be provided to a device that is determined to be close to the user or a device that the user will see or is looking at. For example, if the user device 106 of the user has not been used by the user for a threshold period of time, the user, and the user is using another device, the action processing system 120 may determine to present the user defined action to the device the user is using.

A variety of user interfaces and interaction models can be used to facilitate the creation of action triggers and the presentation of results from actions being performed. FIGS. 3A-3C and 4A-4C are examples of several user interfaces.

Figure 3A:
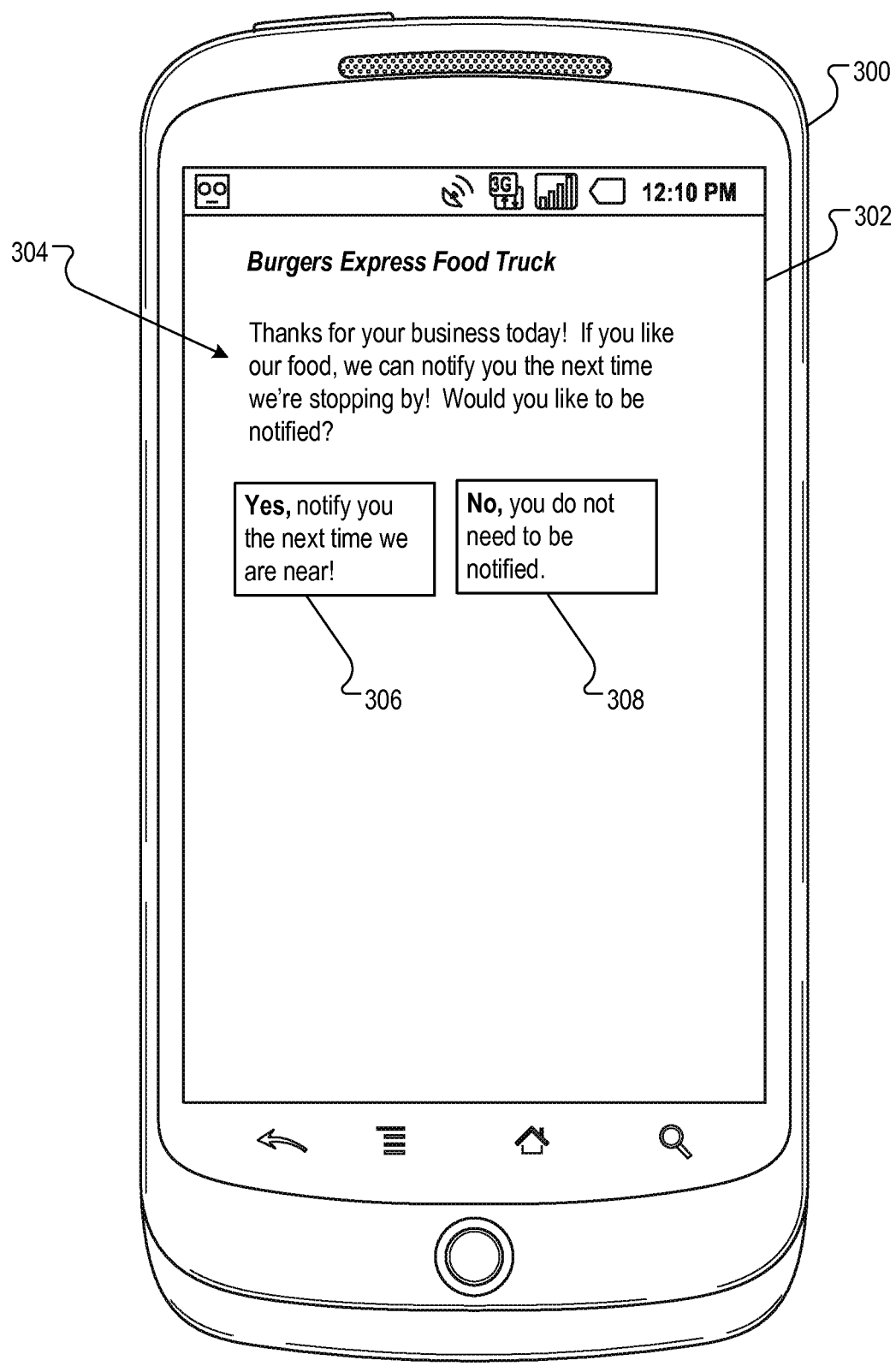
FIGS. 3A-3C are illustrations of user interfaces at a user device and in which an action trigger is created and the results of an action being performed are displayed.
Figure 3B:
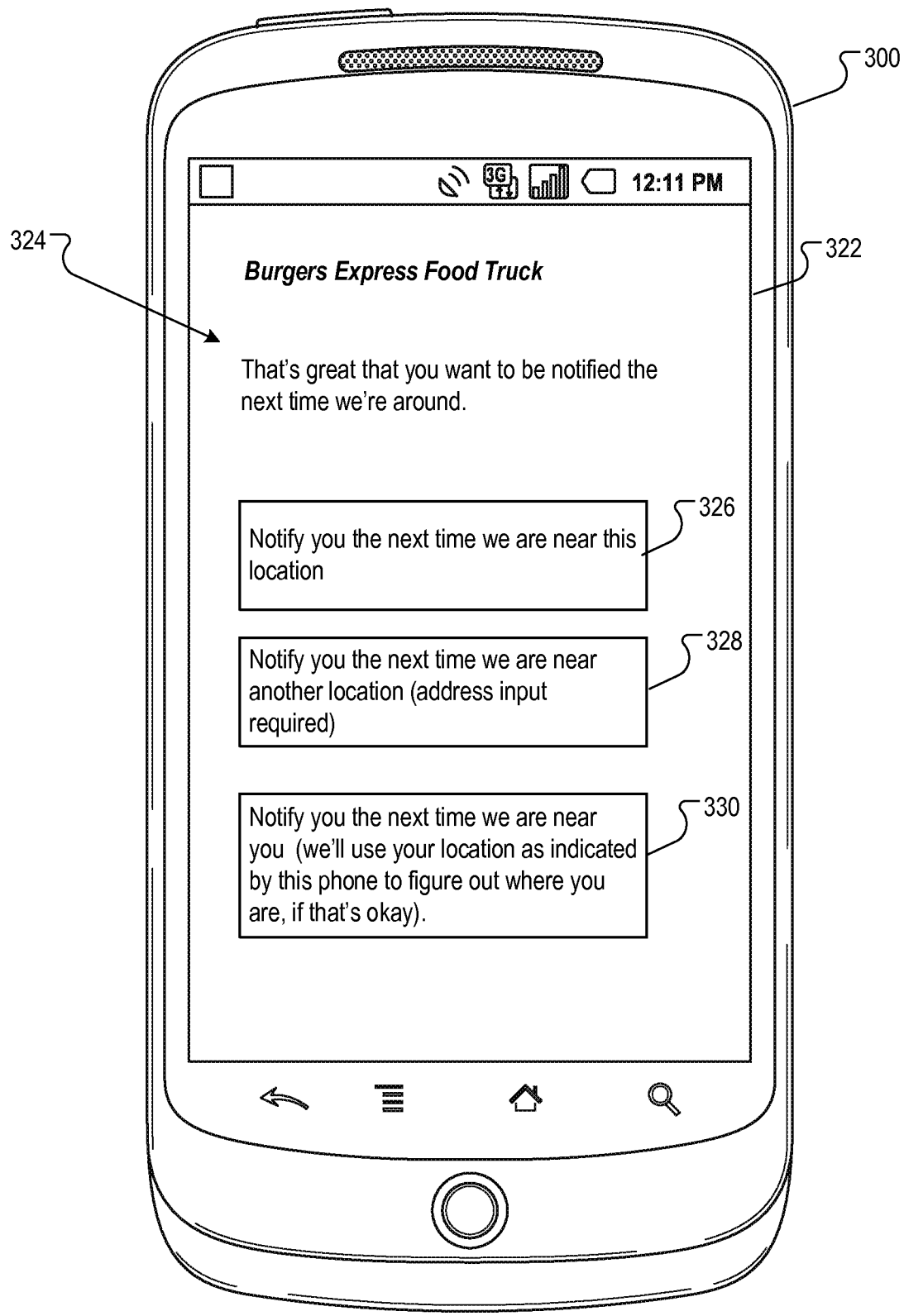
Figure 3C:
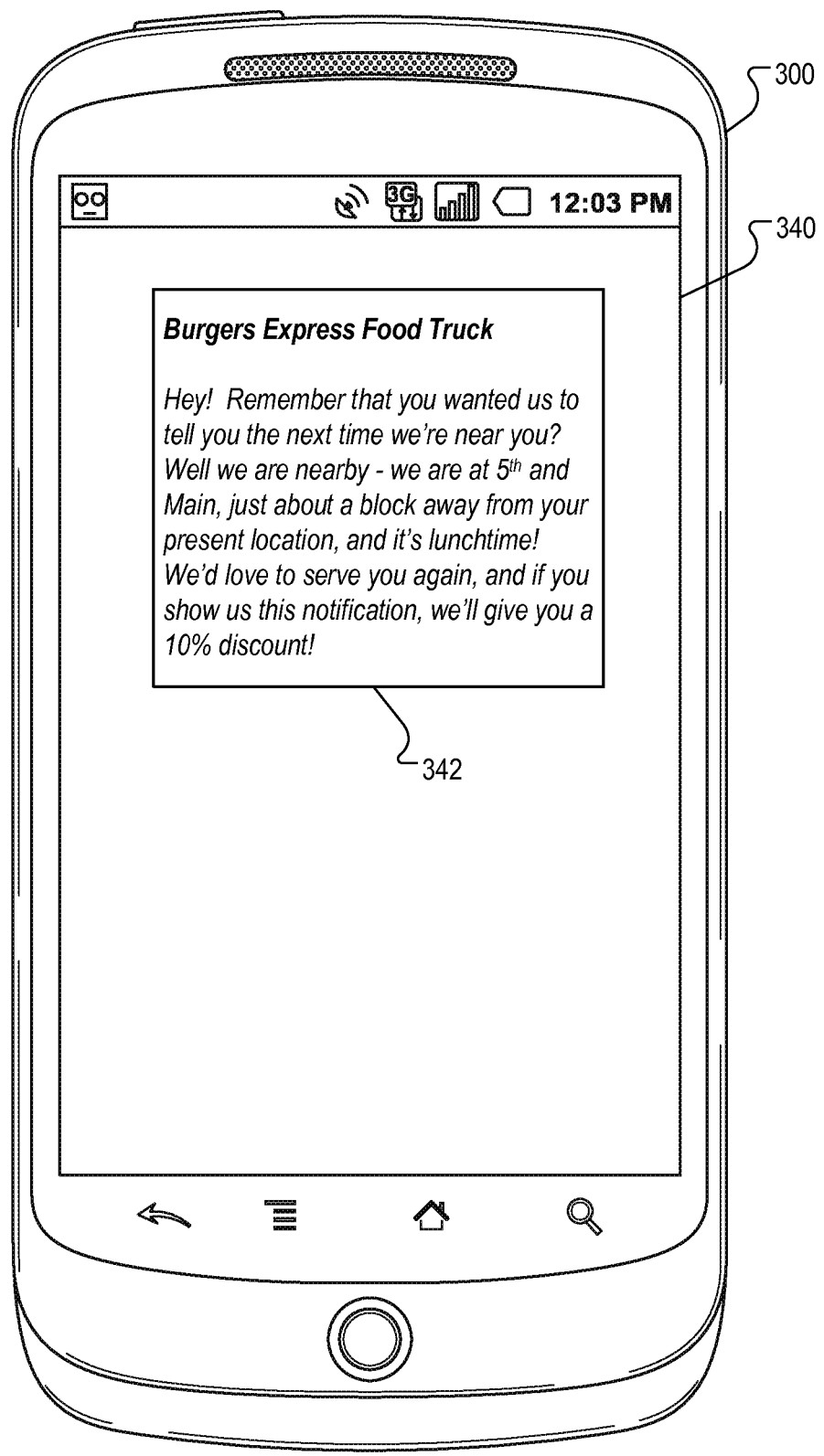

FIGS. 3A-3C are illustrations of user interfaces 302, 322, and 340 at a user device 300 and in which an action trigger is created and the results of an action being performed are displayed. In this example, an action trigger for a physical entity of a food truck is created. The physical environment feature is a location of the food truck, and the event is the presence of the food truck at, or within a threshold distance of, the location. The action that is performed is a notification to a user.

FIG. 3A depicts a user interface 302 in which a prompt 304 to generate an action trigger is presented. The user device 300 can be caused to present the prompt in a variety of ways. For example, if the user device is used to consummate a purchase from the vendor, the prompt may be presented automatically. Alternatively, the user may navigate to a website or initiate a native application that causes the prompt to be presented. In yet another example, the user device may use NFC/Bluetooth or other personal area RF technology to communicate with a system on the food truck. In this latter example, the user may set a preference that allows the user device 300 to be "discovered" for the purposes of establishing action triggers, and the food truck may include a device that broadcasts a data signal that identifies the food truck and that, optionally, triggers a message to any nearby user device that causes the user device to display a user interface to facilitate the creation of a trigger. In still another example, the user device may scan a code, such as a QR code or bar code, on the food truck, or tap a sign on the food truck that reads "tap your phone on the food truck sign in order to be alerted when it is here next" which causes the user device to receive the data signal via a short range RF signally protocol.

Two options are presented—selection of the first option 306 will continue to the user interface of FIG. 3B, and the selection of the second option 308 will end the process. Turning now to FIG. 3B, the user interface 322 includes a second prompt 324 and three options 326, 328 and 330, each which corresponding to an event for a physical environment feature. The first option 326 defines an event that occurs when the food truck is again near the location the food truck is currently occupying. The second option 328 defines an event that occurs when the food truck is near a location that the user specifies. The third option 330 defines an event that occurs when the food truck is near a location of the user. The location of the user is determined by the location of the user device 300.

Assume the user selects the third option 330. This will create an action trigger that specifies an event that occurs the next time the food truck is near the user. Although not shown, the user may be allowed to specify additional conditions, e.g., the event may only occur on weekdays and between the hours of 11:30 AM and 1:00 PM and monitoring may not initiate until the next day, for example. The action trigger is then provided to the action trigger processing system 120 for monitoring.

To determine whether the event has occurred, the action trigger processing system 120 may receive location data of the food truck and the user device, either by request or by push. The location data specifies the current location of the physical entity food truck, and the physical environment feature of the location of the user device. The action trigger processing system 120 determines whether a proximity of the current location of the food truck to the location of the user device is less than a threshold proximity. The threshold proximity may be set by the user, or may be automatically set by the system 120. For example, a radius of a certain distance may be used. The system 120 determines the event has occurred when the proximity is less than a threshold proximity.

Another way that location data may be determined is by receiving data from a visual tracking system. For example, when a user specifies a particular food truck, the particular food truck's location may be determined by monitoring and tracking the location of the food truck by, for example, a satellite system that has the capability to track such physical entities. The satellite system (or any other visual based tracking system) may then provide location data to the action trigger processing system 120 for monitoring and processing.

FIG. 3C depicts a user interface 340 in which a notification 342 is presented in response to determining the event has occurred. Instead of or in addition to the notification 342, other actions could also be performed, such as the advance purchase of menu items, etc.

Figure 4A:
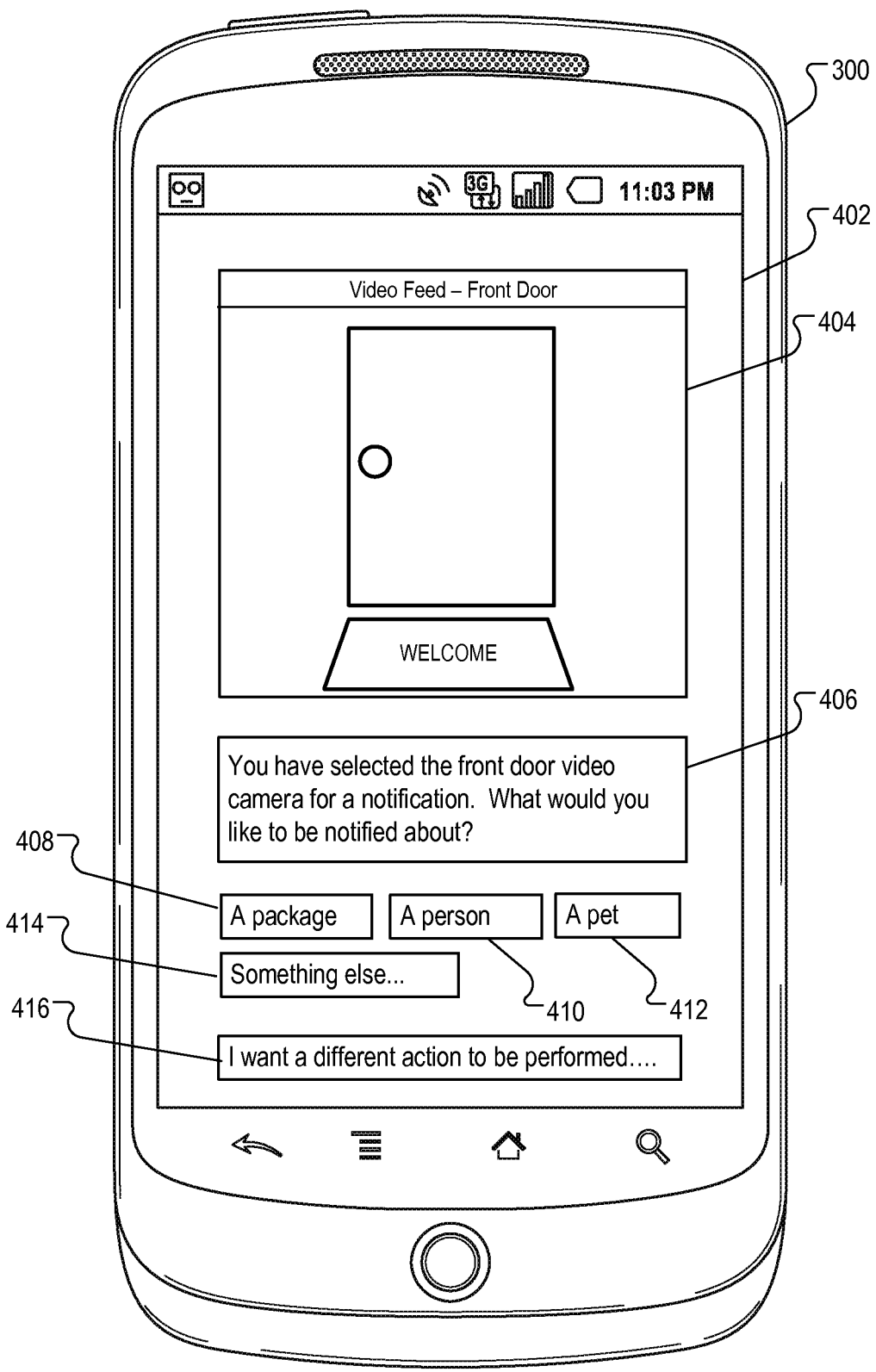
FIGS. 4A-4C are illustrations of user interfaces at a user device and in which another action trigger is created and the results of an action being performed are displayed.
Figure 4B:
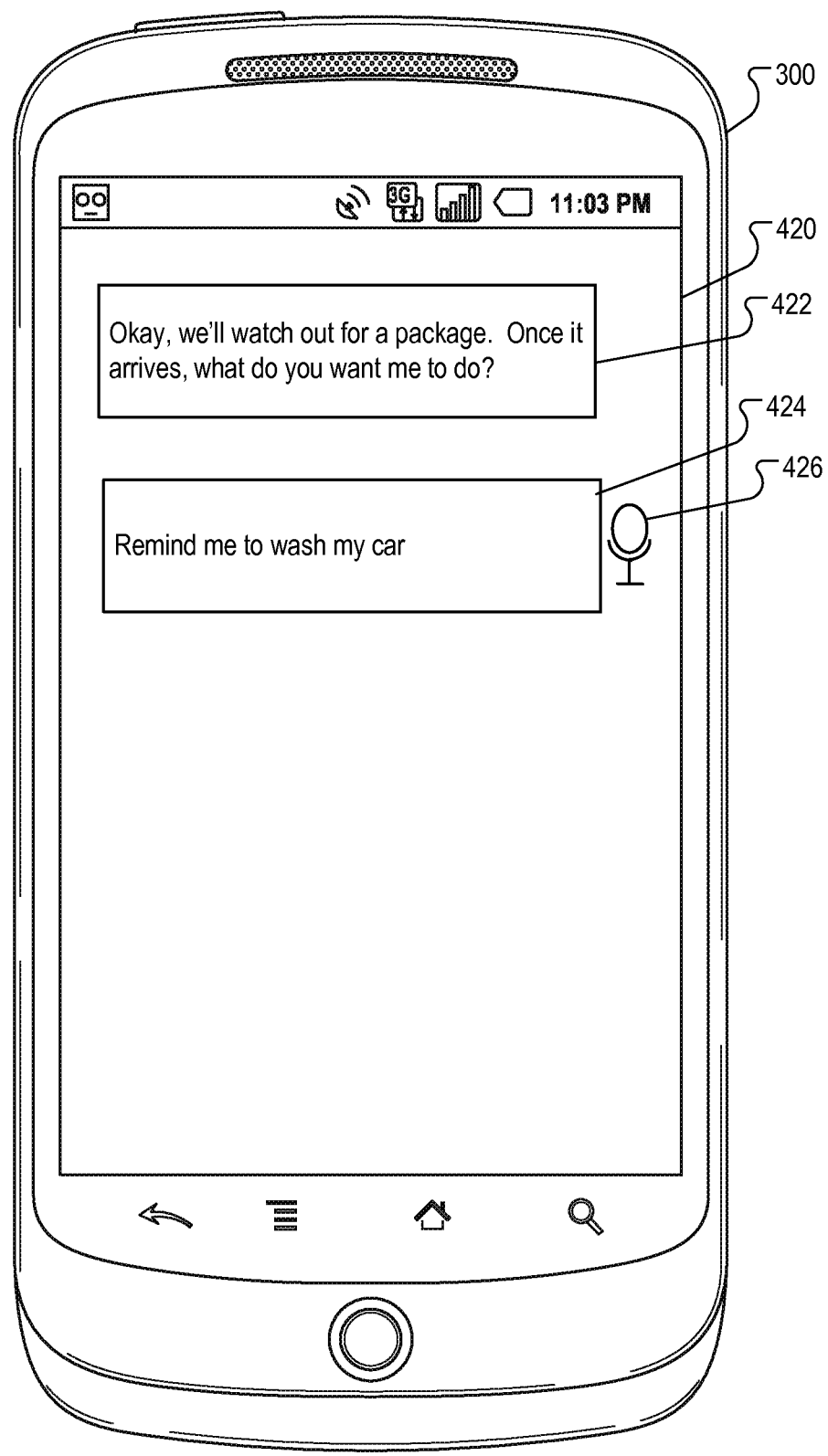
Figure 4C:
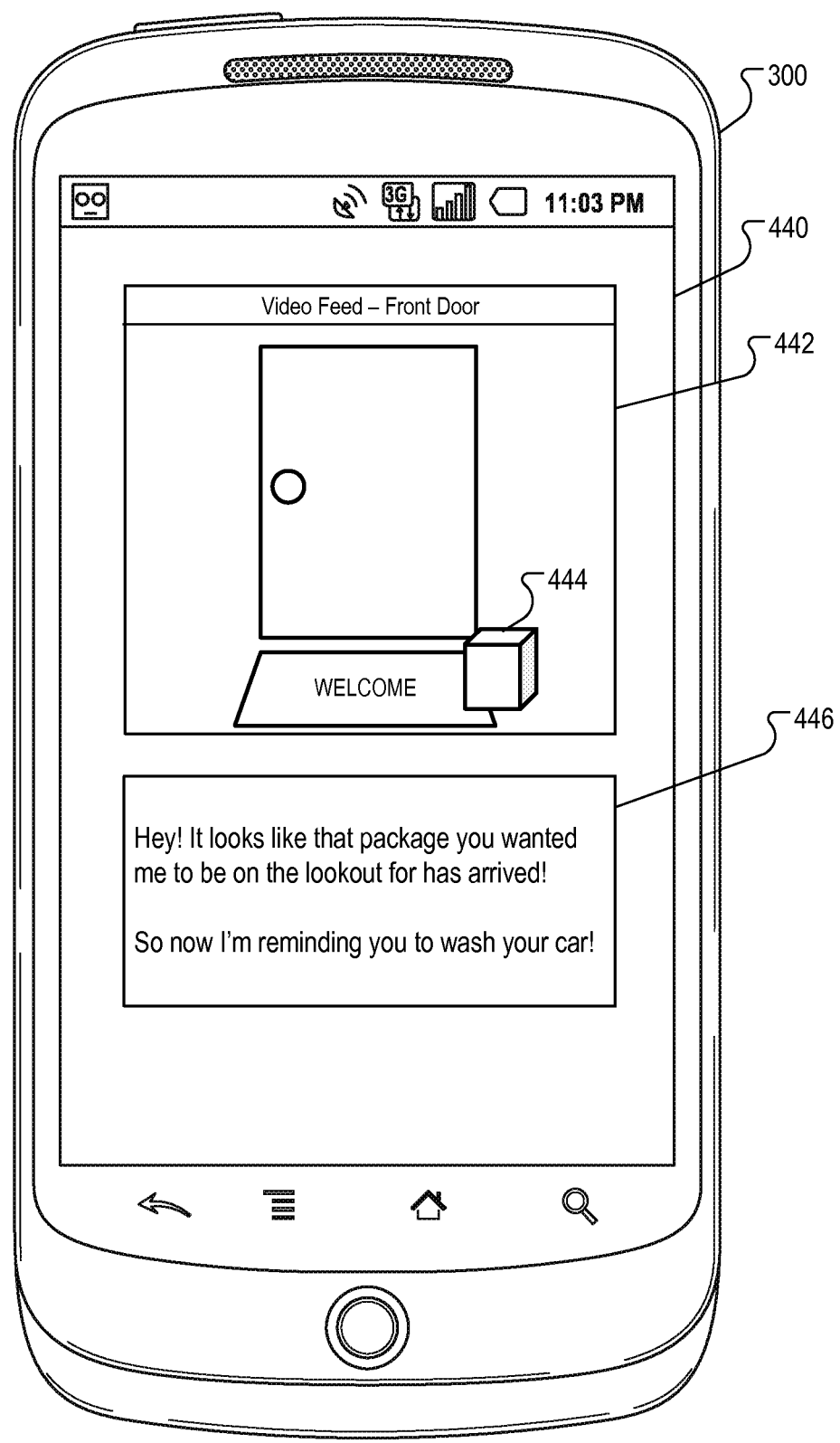

FIGS. 4A-4C are illustrations of user interfaces 402, 420 and 440 at a user device 300 and in which another an action trigger is created and the results of an action being performed are displayed. In this example, an action trigger for a physical entity of a delivery item is created. The physical environment feature is a location of a door step, and the event is the presence of the delivery item at the door step. The action that is performed is a notification to a user.

In FIG. 4A, the user has invoked a user interface that facilitates the generation of an action trigger. The user device 300 may be able to receive data from, for example, a user's security system, and the user has selected a video feed of the user's front door, as shown in the image 404. A prompt 406 describes that the user has selected a particular video camera, provides options 408, 410, 412 and 414 for receiving a notification.

The action trigger processing system 120 (or, alternatively, the user device 400), can include a machine learned system that has been trained to recognize various objects, such as those listed in the options 408, 410 and 412. The user may also select option 414 to describe a different object. A variety of machine learned image recognition models can be used to detect particular objects.

Finally, option 416 may be selected if the user desires to specify a different action to be performed. Such different actions may include an e-mail with an image of the object on the doorstep when the object is detected, or the automatic ringing of the doorbell, or any other action that can be associated with the event.

Assume that in this example the user may desire to wash his car, but discovered he is out of concentrated automobile soap. The user ordered a bottle of the concentrated soap from an on-line retailer and is awaiting delivery and wants to be reminded to wash his car when the package is delivered. Accordingly, the user selects option 408.

In response to the selection of option 408, the user interface 420 of FIG. 4B is displayed. The user interface 420 includes a confirmation message and prompt 422. Input display 424 shows the reminder command message the user is generating by use of a mic input 426. Once the user's input is complete, the corresponding action trigger is generated.

The action trigger is then sent to the action trigger processing system 120 (or, alternately, persisted only to the user device 300 if the user device performs the monitoring function).

The system then monitors for the occurrence of the event. In this example, the system may iteratively receive images, such as video frames, of the physical environment feature of the doorstep location. For each iteration, image processing is performed to determine whether the delivery box physical entity is depicted within the image. When the delivery box is determined to be present in the image, the system determines the event has occurred and performs the associated action of presenting a reminder.

FIG. 4C depicts a user interface 440 in which a notification 446 is presented in response to determining the event has occurred. The user interface includes the image 442, and depicted in the image is a container 444 at the doorstep. The notification 446 is descriptive of the event and includes the reminder specified by the user.

As described above, in some implementations, events that are being monitored may be subject to automatic change by the system 120, and so may the actions. The changes may be the result of conditions that affect a value associated with an event or action. For example, returning to the food truck example, the system may analyze feedback from notifications provided when a threshold distance is 1,000 meters. The system 120 may determine that users that are more than 500 meters distance from the food truck when provided with a notifications frequent the food truck at a much lower rate than users that are less than 500 meters distance from the food truck when provided with a notification. Thus, the system may change the event occurrence from 1,000 meters to 500 meters. Likewise, actions may also be subject to an automatic change by the system 120.

Furthermore, a user need not utilize a particular user device to establish a trigger. Instead, any device from which a user input can be associated with a user can be used to establish a trigger. For example, a user may simply speak into a security camera when leaving for the day. Because the security camera is tied to a system associated with a user account of the user, the resulting voice command may be used to establish an action trigger for the user. Returning to the automobile detergent example, the user, upon leaving for the work day, may simply utter to the camera "Let me know when a box is delivered." The system 120, utilizing existing semantic and voice command algorithms, can parse the user's voice command and establish the action trigger for the user.

In some implementations, a user may specify an action for which the object of the action is another user. For example, returning to the automobile detergent example, the user, upon leaving for the work day, may utter to the camera "Notify Jack Child to get the car detergent at the door and then wash my car when a box is delivered." The system 120 may access the user's contact information and determine that Jack Child is the user's son, and will generation the required notification on the a device associated with Jack Child when the box is delivered, e.g., "Please get the car detergent at the door and wash your dad's car."

Additionally, an action need not be specified when an action is determined to follow from an event. An action may be determined to follow from an event based, for example, on user history, or based on entity relation models that associate actions with events. For example, a user may let a pet out into a fenced-in yard and utter the voice command "watch for the dog at the door." Based on either user history of prior action triggers (e.g., "Let the dog in when you see him at the door," "notify me when the dog is at the door," etc.) the system may infer an action to notify the user when it later detects a dog at the door, or alternatively, may automatically open the door to let the dog in and then close the door, provided the door is so equipped from such remote actuation.

In some implementations, events may again be monitored after the performance of an action, or after a delay after the action is performed. This allows for the "resetting" of an action trigger without user intervention, and is useful in the context of repetitive actions based on repetitive events. For example, a refrigerator appliance with a camera may monitor certain grocery items, such as a carton of milk. When the carton of milk is only ⅓ full, the system may perform the action of ordering an additional carton of milk. The system may also learn response times and automatically adjust the event trigger. For example, if delivery time for the milk is such that the user runs out of milk before the carton arrives, as detected by the refrigerator being without a carton of milk, the system may monitor for the carton of milk being half empty instead of ⅔ empty, and place the order when the carton is half empty.

The system may also adjust the trigger based on other data that indicate a trigger should be adjusted. Such data includes data that may indicate that a user's particular need fulfilled by an action may go unfulfilled after the action is performed. For example, an action that fulfills a consumption need may be adjusted based on data indicative of a consumption rate. To illustrate, assume that the system, by accessing a user's calendar, identifies the user will have guests for a week. The system may determine, based on the number of guests, that it should change the event from the milk being ⅓ full to half full to place the order while the guests are present. Likewise, should the system recognized additional people in the user's home for an extended period, then the system may adjust action triggers accordingly.

In situations in which the systems discussed herein collect personal information about users, or may make use of personal information, the users may be provided with an opportunity to control whether programs or features collect user information (e.g., information about a user's social network, social actions or activities, profession, a user's preferences, a user's current location, location trajectory, inferred locations such as home/work, inferred context, calendar data, upcoming events/bookings from email, etc.), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 5:
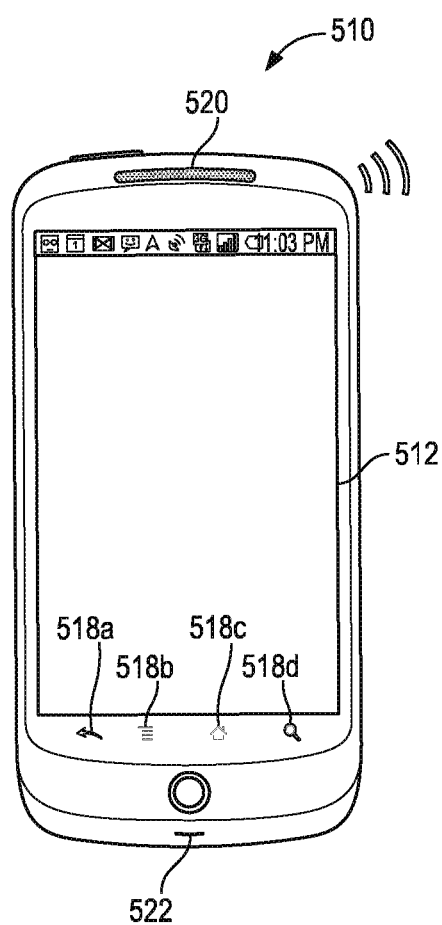
FIG. 5 is a block diagram of an example mobile computing device.

FIG. 5 is a block diagram of example mobile computing device. In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

The mobile computing device 510 may include other applications, computing sub-systems, and hardware. A voice recognition service 572 may receive voice communication data received by the mobile computing device's microphone 522, and translate the voice communication into corresponding textual data or perform voice recognition.

The mobile computing device 510 may communicate wirelessly with one or more networks to provide a variety of services, such as voice and data services.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
receiving, by a data processing apparatus, data specifying a physical environment feature for a physical entity;
providing to a user device data that causes the user device to display an action trigger menu that displays a respective event selection input for each of a plurality of events associated with the physical environment feature, and displays only a first set of actions that can be associated with the events;
receiving, by the data processing apparatus, data specifying a selection at the user device of an event from the plurality of events associated with the physical environment feature;
receiving, by the data processing apparatus, data indicating an action associated with the event and to be taken in response to the occurrence of the event, wherein the action is defined by the user, and is independent of the event for the physical environmental feature and independent of the physical entity, and is not an action included in the first set of actions, the receiving data comprising:
receiving, by the data processing apparatus, data indicating an action input by the user by use of an assistant operating on the user device, wherein the action input by the user is not an action included in the first set of actions and is defined by the user independent of the event and the physical entity, and the action is semantically defined by the user by a voice command that is parsed by the assistant to determine the action;
receiving, by the data processing apparatus, data indicating the action input by the user is associated, by the user, with the event so that the action will be taken in response to the occurrence of the event;
monitoring for the occurrence of the event for the physical environment feature; and
in response to the occurrence of the event, causing the action associated with the event to be performed.

2. The method of claim 1, further comprising:
storing the data specifying the event and the action to be taken in response to the occurrence of the event in an action trigger data store; and
wherein monitoring for the occurrence of the event for the physical entity comprises monitoring for the occurrence of the event for the physical entity based on the data stored in the action trigger data store.

3. The method of claim 2, further comprising inferring, by the data processing apparatus and based on the event, the action to be performed.

4. The method of claim 1, wherein the action is a notification presentation to the user; and
causing the action associated with the event to be performed comprises:
determining, based on one or more notification conditions, whether to delay presentation of the notification to the user.

5. The method of claim 1, wherein the physical environment feature is described by an image of the physical environment feature.

6. The method of claim 5, wherein the image of the physical environment feature is an image of a location without the physical entity, and the event is the presence of the physical entity at the location.

7. The method of claim 5, wherein monitoring for the occurrence of the event for the physical entity comprises:
iteratively receiving images of the physical environment feature;
for each iteration, determining by image processing whether the physical entity is depicted within the image; and
determining the event has occurred when the physical entity is determined to be depicted within the image.

8. The method of claim 1, wherein monitoring for the occurrence of the event for the physical entity comprises:
receiving location data specifying a current location of the physical entity;
determining a proximity of the current location of the physical entity to the location of the of the physical environment feature; and
determining the event has occurred when the proximity is less than a threshold proximity.

9. The method of claim 1, wherein the physical environment feature is described by a data signal generated by the physical entity.

10. The method of claim 9, wherein the data signal identifies the physical entity, and further comprising:
receiving location data specifying a current location of the physical entity;
determining a proximity of the current location of the physical entity to the location of the of the physical environment feature; and
determining that the event has occurred when the proximity is less than a threshold proximity.

11. The method of claim 9, wherein:
the data signal identifies the physical entity and includes data indicating a condition of the physical entity that is independent of the physical entity's location;
and further comprising:
receiving physical entity data specifying a current condition of the physical entity;
determining whether the current condition of the physical entity satisfies the condition of the physical entity specified by the event; and
determining the event has occurred when the current condition of the physical entity satisfies the condition of the physical entity specified by the event.

12. The method of claim 1, wherein:
the physical environment feature detected by the user device is a location of a physical entity; and
monitoring for the occurrence of the event for the physical entity comprises:
receiving location data specifying a current location of a user device;
determining a proximity of the current location of the user device to the location of the physical entity; and
determining the event has occurred when the proximity is less than a threshold proximity.

13. A system, comprising:
a processor; and
a computer-readable medium coupled to the processor and having instructions stored thereon, which, when executed by the processor, cause the processor to perform operations comprising:
data specifying a physical environment feature for a physical entity;
providing to a user device data that causes the user device to display an action trigger menu that displays a respective event selection input for each of a plurality of events associated with the physical environment feature, and displays only a first set of actions that can be associated with the events;

receiving, by the data processing apparatus, data specifying a selection at the user device of an event from the plurality of events associated with the physical environment feature;

receiving, by the data processing apparatus, data indicating an action associated with the event and to be taken in response to the occurrence of the event, wherein the action is defined by the user, and is independent of the event for the physical environmental feature and independent of the physical entity, and is not an action included in the first set of actions, the receiving data comprising:

receiving, by the data processing apparatus, data indicating an action input by the user by use of an assistant operating on the user device, wherein the action input by the user is not an action included in the first set of actions and is defined by the user independent of the event and the physical entity, and the action is semantically defined by the user by a voice command that is parsed by the assistant to determine the action;

receiving, by the data processing apparatus, data indicating the action input by the user is associated, by the user, with the event so that the action will be taken in response to the occurrence of the event;

monitoring for the occurrence of the event for the physical entity; and in response to the occurrence of the event, causing the action associated with the event to be performed.

14. The system of claim 13, the operations further comprising:

determining, based on an association of events to a plurality of actions and the event, corresponding actions associated with the event;

providing to the user device data that causes the user device to display within the action trigger menu a respective action selection input for each of the corresponding actions associated with the event;

wherein the data indicating the action associated with the event received by the user device is in response to a selection of one of the action selection inputs selected by the user of the user device.

15. The system of claim 13, wherein monitoring for the occurrence of the event for the physical entity comprises:

receiving location data specifying a current location of the physical entity;

determining a proximity of the current location of the physical entity to the location of the of the physical environment feature; and determining the event has occurred when the proximity is less than a threshold proximity.

* * * * *